Nov. 14, 1967  H. VAN KAMPEN  3,352,288
POULTRY HELMET
Filed Jan. 3, 1966
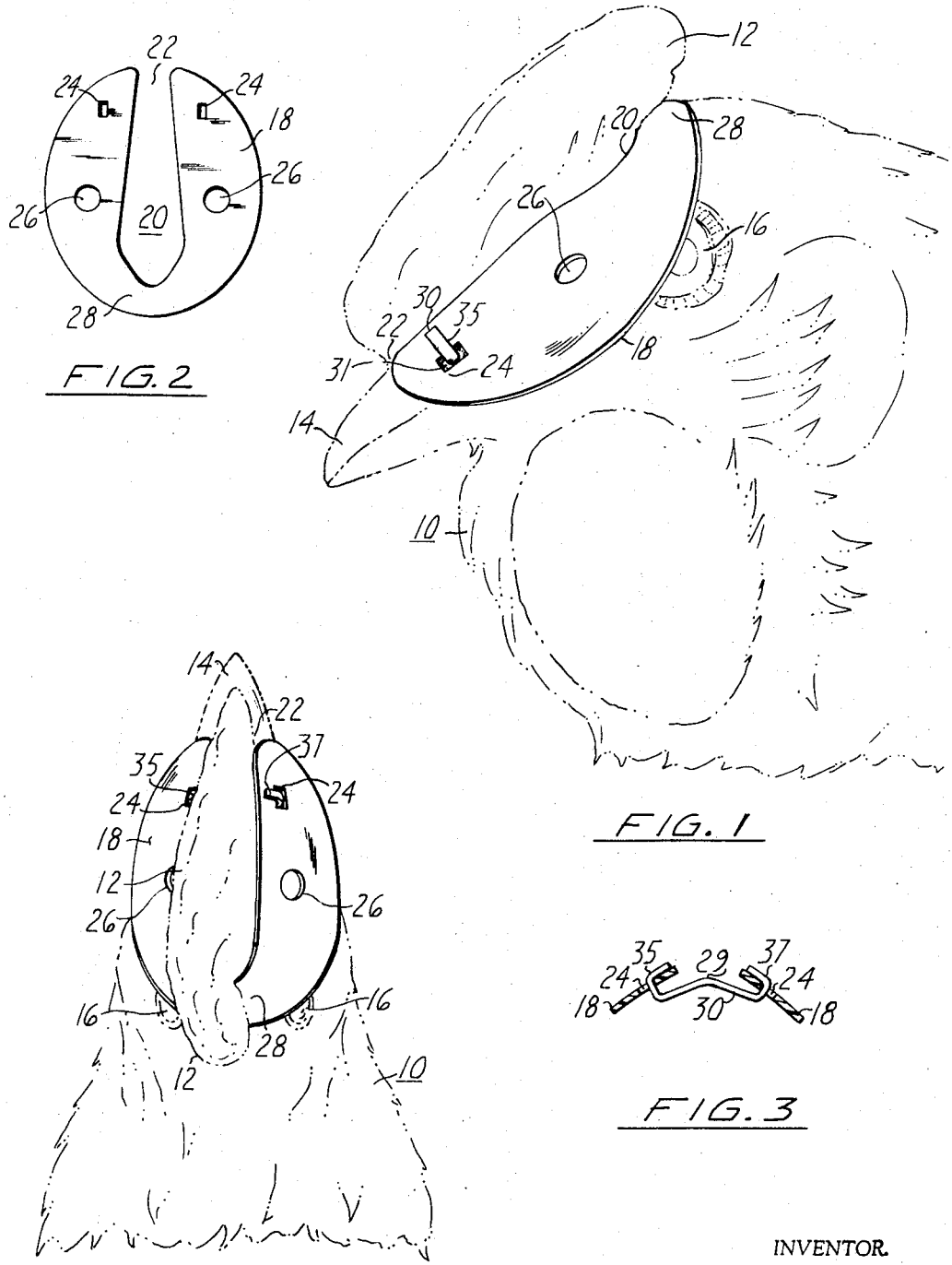
INVENTOR.
HENRY VAN KAMPEN
BY
Carl R. Brown
ATTORNEY United States Patent Office 3,352,288
Patented Nov. 14, 1967

3,352,288
POULTRY HELMET
Henry Van Kampen, Rte. 1, Box 5102,
San Marcos, Calif. 92069
Filed Jan. 3, 1966, Ser. No. 518,083
9 Claims. (Cl. 119—97)

ABSTRACT OF THE DISCLOSURE

This poultry helmet comprises a flexible member of oval or round shape having a slot with an opening at one end for sliding the flexible member along the base of the poultry comb into the mounted position and being secured adjacent the opening to the beak of the poultry in a manner to block the poultry's ahead vision while not interfering with eating, drinking and breathing of the poultry.

*Background of the invention*

The existence of cannibalism, feather picking and egg eating by poultry is well known to poultrymen. This serious problem causes considerable losses to poultrymen each year. To combat this problem, spectacle type blinder devices have been used to restrict the poultry's forward vision. These prior art devices fit on the beak of the poultry and are held by pins passing through the poultry's nostrils. While these devices usually accomplish the purpose of restricting the forward vision, they also catch on the wire fencing or the like, that are used to contain the poultry. When this occurs, the panicking poultry can damage themselves, pull off the blinders, or seriously injure their beaks and respiratory system. Also the prior art devices restrict the flow of air and nasal discharge through the nostrils, and thus impair the functioning of the poultry's respiratory system.

Therefore it is an object of this invention to provide a novel and improved device to stop cannibalism, feather picking and the like by poultry.

It is another object of this invention to provide a novel and improved poultry helmet for restricting cannibalism, feather picking, egg eating, flightiness, and nervousness by poultry.

It is another object of this invention to provide an improved and novel device for reducing cannibalism, feather picking, egg eating or the like in poultry while not adversely interfering with the function of poultry's respiratory system.

It is another object of this invention to provide an improved and novel poultry helmet for preventing cannibalism, feather picking and the like, by poultry that will not damage their beaks.

It is another object of this invention to provide an improved and novel device for preventing cannibalism, feather picking and the like by poultry that is simple to install, inexpensive to make and that will not be lost by the poultry.

My invention contemplates accomplishing the foregoing objects by securing a thin flexible member onto the heads of poultry. The mounted flexible member obstructs the poultry's upward and forward vision, while permitting unobstructed side, rear and forward-down vision. The flexible member may have an oval or circular shape with a longitudinal slot therein that fits around the comb of the poultry. Apertures in the end of the flexible member adjacent to the poultry's nostrils receive a longitudinal pin that passes through the apertures and nostrils and secures the flexible member to the poultry. The securing pin also forces the flexible member into a substantially curved shape that curves the flexible member down over the head of the poultry to obstruct the poultry's forward view. The flexible member may have air flow apertures cut therethrough or may be made of porous material to permit free passage of air through the flexible helmet member to the head of the poultry. The longitudinal slot may be open to facilitate mounting the helmet onto the poultry and further to not interfere with the free passage of air through the poultry's respiratory system.

Other objects and advantages will be apparent to those familiar with the use of this invention as described in the following specification and accompanying drawings in which:

FIGURE 1 is a side view of the head of a fowl with an embodiment of the invention mounted thereon.

FIGURE 2 is a top plan view of an embodiment of the flexible helmet of this invention prior to installation onto the poultry.

FIGURE 3 is a view partly in cross section of the manner of securing the helmet to the poultry.

FIGURE 4 is a top view of the fowl's head with the embodiment of the poultry helmet of this invention mounted thereon.

Referring now to FIGURES 1 and 2, fowl 10 with a normal comb 12 and beak 14 has a flexible member positioned thereon. The eyes 16, that normally are capable of looking forward, down, upward or to the rear in the well known manner are incapable of looking forward because of the obstructing member 18. Thus the fowl cannot see to peck with the beak 14 in acts of cannibalism or feather picking. Yet the fowl 10 can see *under* the forward end of member 18 to eat and drink.

The flexible helmet member 18 may be made of thin flexible material and has a substantially circular or oval shape with a longitudinal aperture or slot 20 therein. This aperture is shaped to fit around the comb 12 with the closed end 28 fitting against the root of the rear portion of the comb 12. Apertures 24 in the forward portion of the flexible member are located to align with the fowl's nostrils when the flexible member 18 is mounted as shown in FIGURE 1. Securing member 30 is inserted through apertures 24 and through the fowl's nostrils 31 securing the helmet 18. When secured, the flexible member 18 curves over the fowl's head but is spaced therefrom to prevent direct contact with or against the eye 16 or the side of the head. I have found that it is undesirable for the flexible member to contact the side of the fowl's head or eye because abrasions, collection of dirt or the like, could over a period of time be harmful to the fowl.

The flexible member 18 may be made of any suitable material such as opaque plastic or the like, or from a porous material that allows free flow of air therethrough to the head of the fowl. Poultry release moisture through breathing, thus the tendency of the flexible member to collect moisture on the head of the fowl should be reduced. Apertures 26 permit the flow of air therethrough. However, it should be recognized that free flow of air through the porous material will eliminate the moisture problem. Because the fowl's vision is restricted in the forward direction, which is at an acute angle to the surface of the flexible member, the flexible member may be made from a porous material and still sufficiently restrict the fowl's vision in the forward direction.

While any type of retaining means may be used to secure the helmet of this invention to the poultry, the apparatus shown in FIGURE 3 is particularly advantageous for use with the poultry helmet of this invention. A longitudinal pin type member may be passed through apertures 24 and through the fowl's nostrils 31. The ends 35 and 37 are then bent as shown to secure the apparatus. The pin 30 may be made of stainless steel or other suitable non-corrosive material, and have any cross sectional shape such as round or rectangular. It is important that the cross section be as small as possible to reduce the volume occupied by the pin 30 in order that the respiratory system still may function properly. The pin 30 has sufficient gauge to provide that strength required to hold the helmet on the fowl. The pin can closely resemble the known staple and can be bent the same as a staple with standard pointed pliers. The pin may be bent at or near its' mid-point 29 to provide the desired downward angle to the flexible member 18 to assure that it fits as desired around the fowl's head 10.

In operation, the flexible member is moved forward along the top surface of the fowl's head with the comb 12 in opening 20 until the end portion 28 contacts the rear root portion of the comb 12. Pin 30 is then inserted through one aperture 24, through the nostrils 31 and through the other aperture 24. The ends 35 and 37 are then bent, securing the helmet 18 to the fowl's head.

My invention works with poultry in cages or on floor birds, and works particularly well on severely debeaked birds, that do not have sufficient beak to support the spectacle type blinder devices. The opening 22 in the flexible member 18 permits open spacing between and around the flexible member and the nostrils 31. Thus there is less clogging of the respiratory system with wet mash or nasal discharge and the poultry can breathe more freely.

I have found that my invention does not irritate or agitate the poultry and thus aids in reducing the flightiness and nervousness of the poultry. The poultry thus become more quiet and gentle; they do not tend to dominate each other and consequently timid birds thrive better and fewer become culls. This permits the poultry to be moved closer together periodically to fill empty spaces.

It is apparent that many modifications and variations in the poultry helmet of my invention may be made by one skilled in the art, in accordance with the principles of the invention hereinabove set forth and without the exercise of any inventive ingenuity. I desire, therefore, to be protected for any and all such modifications and variations that may be made within the spirit of the invention and the scope of the claims.

I claim:
1. A poultry helmet comprising,
    a thin substantially opaque flexible member,
    said member having a narrow slot means therein with an opening at one end and a closed portion at the other end for sliding and mounting said opening along the base of the comb of the poultry to position said member around the comb,
    and securing means for securing fastening portions of said member adjacent said open end of said slot to the beak of the poultry and holding said member around the comb of the poultry.
2. A poultry helmet as claimed in claim 1 wherein, said securing means does not close said opening at said one end of said slot means.
3. A poultry helmet as defined in claim 1 wherein, said slot means extends through a substantial length of said member.
4. A poultry helmet as defined in claim 1 wherein, said securing means passes through the nostrils of the poultry.
5. A poultry helmet as defined in claim 1 wherein, said flexible member has a substantially oval shape and when secured to the poultry is curved to shade the forward vision of the poultry.
6. A poultry helmet as defined in claim 1 wherein, said flexible member is made of sufficiently porous material to permit air flow therethrough.
7. A poultry helmet as defined in claim 1 wherein, said slot extends through a substantial length of said member and has a configuration and size similar to the outer surface of the base of the comb of the poultry,
    said flexible member has a pair of separated ends adjacent said open end of said slot and said closed portion is immediately adjacent the rear base of the comb of the poultry when mounted on the poultry,
    and said securing means interconnects each of said ends of said flexible member with the beak of the poultry.
8. A poultry helmet as defined in claim 7, wherein said flexible member has a substantially oval or circular shape and when secured to the poultry is curved to shade the forward vision of the poultry.
9. A poultry helmet as defined in claim 7 wherein, said securing means comprises a pin like member that passes through openings in said flexible member and through the poultry's nostrils.

References Cited
UNITED STATES PATENTS

| | | | |
|---|---|---|---|
| 582,320 | 5/1897 | Sparks | 119—97 |
| 1,134,816 | 4/1915 | Brockman | 54—10 |
| 1,962,395 | 6/1934 | Jones | 119—104 X |
| 2,079,107 | 5/1937 | Cridlebaugh | 119—97 |
| 2,445,867 | 7/1948 | Wolfson | 119—97 |
| 2,718,212 | 9/1955 | Bartner | 119—97 |
| 2,718,213 | 9/1955 | Bartner | 119—97 |

ALDRICH F. MEDBERY, *Primary Examiner.*